United States Patent
Cagle, Jr. et al.

(10) Patent No.: US 9,683,120 B2
(45) Date of Patent: Jun. 20, 2017

(54) FIXER FLUIDS

(75) Inventors: Phillip C. Cagle, Jr., San Diego, CA (US); David Michael Ingle, San Diego, CA (US); Yohannes Chonde, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/426,443

(22) PCT Filed: Sep. 14, 2012

(86) PCT No.: PCT/US2012/055652
§ 371 (c)(1),
(2), (4) Date: Mar. 6, 2015

(87) PCT Pub. No.: WO2014/042652
PCT Pub. Date: Mar. 20, 2014

(65) Prior Publication Data
US 2015/0275007 A1    Oct. 1, 2015

(51) Int. Cl.
*C09D 11/36* (2014.01)
*B41M 5/00* (2006.01)
(Continued)

(52) U.S. Cl.
CPC ............ *C09D 11/36* (2013.01); *B41M 5/0017* (2013.01); *C09D 11/10* (2013.01); *C09D 11/107* (2013.01);
(Continued)

(58) Field of Classification Search
None
See application file for complete search history.

(56) References Cited

U.S. PATENT DOCUMENTS

| 6,156,384 A | 12/2000 | Hutter et al. |
| 6,261,350 B1 | 7/2001 | Kabalnov |

(Continued)

FOREIGN PATENT DOCUMENTS

| CN | 1273554 | 11/2000 |
| CN | 1689832 | 11/2005 |

(Continued)

OTHER PUBLICATIONS

Extended European Search Report dated Apr. 13, 2016 for PCT/US2012/055652, Applicant Hewlett-Packard Development Company, L.P.

(Continued)

*Primary Examiner* — An Do
*Assistant Examiner* — Renee I Wilson
(74) *Attorney, Agent, or Firm* — Thorpe, North & Western L.L.P.

(57) ABSTRACT

The present disclosure provides fixer fluid compositions and related systems and methods. In one example, a fixer fluid can comprise a liquid vehicle, a surfactant, and a cationic polymer. The liquid vehicle can include water and co-solvent having a boiling point from 160° C. to 250° C., the co-solvent present in the fixer fluid in an amount of 1 wt % to 40 wt %. The surfactant can be present in the fixer fluid in an amount of 0.1 wt % to 10 wt %. The cationic polymer can be present in the fixer fluid in an amount of 0.1 wt % to 25 wt %. The fixer fluid can be formulated for printing on non-porous media and does not include more than 5 wt % volatile co-solvent and more than 3 wt % non-volatile co-solvent.

26 Claims, 3 Drawing Sheets

(51) Int. Cl.
*C09D 11/107* (2014.01)
*C09D 11/322* (2014.01)
*C09D 11/40* (2014.01)
*C09D 11/54* (2014.01)
*C09D 11/10* (2014.01)

(52) U.S. Cl.
CPC ............ *C09D 11/322* (2013.01); *C09D 11/40* (2013.01); *C09D 11/54* (2013.01); *B41M 5/0047* (2013.01); *B41M 5/0064* (2013.01)

(56) References Cited

U.S. PATENT DOCUMENTS

| | | | |
|---|---|---|---|
| 6,742,869 B2 * | 6/2004 | Redding | C09D 11/322 347/43 |
| 6,779,884 B1 * | 8/2004 | Ma | B41J 2/00 347/100 |
| 7,758,922 B2 | 7/2010 | Simon | |
| 2004/0063808 A1 * | 4/2004 | Ma | C09D 11/54 523/160 |
| 2005/0083385 A1 | 4/2005 | Yue et al. | |
| 2005/0110856 A1 | 5/2005 | Mouri et al. | |
| 2005/0225618 A1 | 10/2005 | Askeland et al. | |
| 2005/0244593 A1 | 11/2005 | Koga et al. | |
| 2006/0023044 A1 * | 2/2006 | Bauer | C09D 11/30 347/100 |
| 2007/0229636 A1 | 10/2007 | Mubarekyan et al. | |
| 2008/0257203 A1 | 10/2008 | Choy et al. | |
| 2008/0259100 A1 * | 10/2008 | Rengaswamy | C09D 11/30 347/1 |
| 2010/0231671 A1 | 9/2010 | Anton et al. | |
| 2010/0295891 A1 | 11/2010 | Goto et al. | |
| 2011/0234689 A1 | 9/2011 | Saito | |
| 2011/0242199 A1 | 10/2011 | Nishimura | |
| 2011/0303113 A1 | 12/2011 | Sarkisian et al. | |

FOREIGN PATENT DOCUMENTS

| | | |
|---|---|---|
| CN | 101056953 | 10/2007 |
| CN | 101096479 | 1/2008 |
| CN | 101351511 | 1/2009 |
| EP | 1018439 | 7/2000 |
| EP | 1243435 | 9/2002 |
| EP | 1403346 | 3/2004 |
| EP | 1426193 | 6/2004 |
| EP | 2362014 | 8/2011 |
| WO | 2006052372 | 5/2006 |
| WO | 2011099977 | 8/2011 |
| WO | 2011105613 | 9/2011 |
| WO | 2012111855 | 8/2012 |

OTHER PUBLICATIONS

International Search Report and Written Opinion dated Mar. 26, 2013 for International Application No. PCT/US2012/055652 filed Sep. 14, 2012, Applicant Hewlett-Packard Development Company, L.P. et al.

* cited by examiner

FIXER FLUIDS

BACKGROUND

Vinyl and other nonporous films are common substrates for signage and other printing applications. Inkjet printing with aqueous inks is increasingly being used to print on these media. It is recognized that inkjet printing of aqueous inks on nonporous media is substantially different than inkjet applications on traditional porous paper-based media. On porous papers, ink drying occurs primarily by ink penetration into the media pore structure, and control of image quality aspects is a strong function of the rate of ink penetration into the media. Thus, optimization of the penetration rate is used for attributes such as optical density and color-to-color bleed. On nonporous media, there is no penetration of the ink into the media, i.e. the colorant remains on the surface of the media, and image quality defects resulting from wetting and ink migration across the nonporous surface are more difficult to control, especially at high printing speeds.

As such, improvements to ink-jet inks and related fluids for non-porous media would be an advancement in the art.

BRIEF DESCRIPTION OF THE DRAWINGS

Additional features and advantages of the disclosure will be apparent from the detailed description which follows, taken in conjunction with the accompanying drawings, which together illustrate, by way of example, features of the disclosure.

Figure 1:
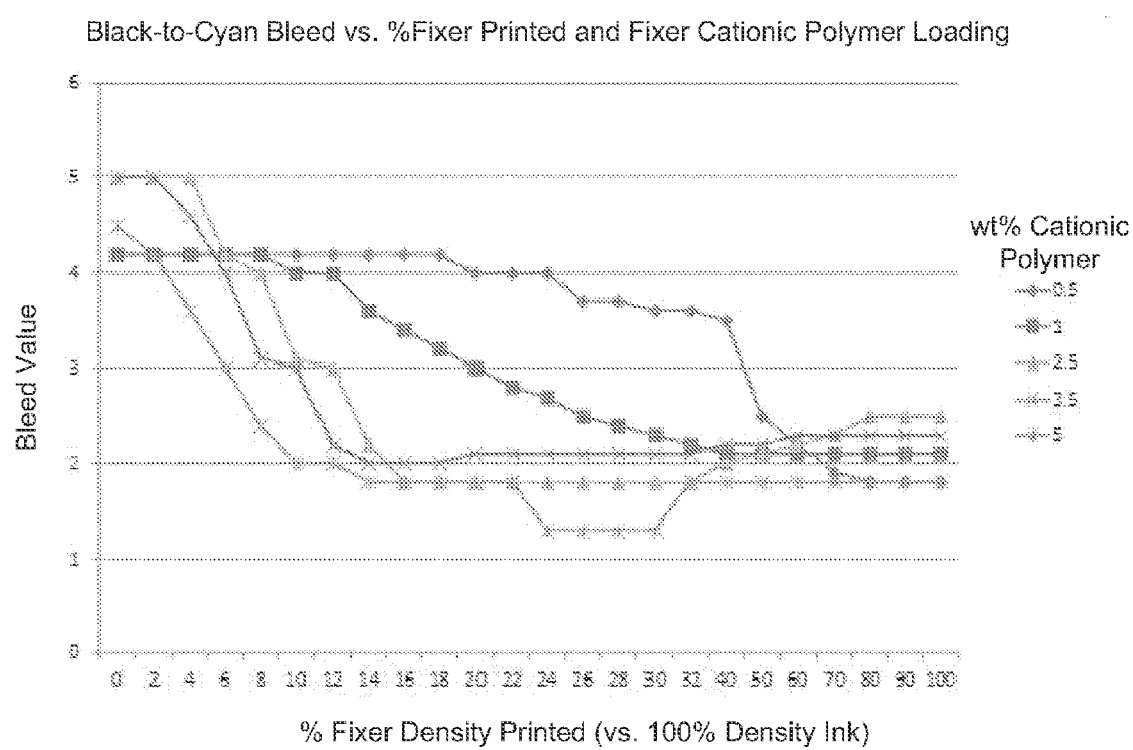
FIG. 1 is a graph of bleed vs. % fixer density printed in accordance with an example of the present disclosure.

Reference will now be made to the exemplary embodiments illustrated herein, and specific language will be used to describe the same. It will nevertheless be understood that no limitation of the scope of the disclosure is thereby intended.

DETAILED DESCRIPTION

In consideration of various methods directed to printing ink-jet inks on non-porous media, various problems and shortcomings have been recognized. For example, one method to control image quality on nonporous media is the use of heated drying. In a typical configuration, the printer contains two heated zones: a print zone and a curing zone. The print zone is the imaging area where the ink is applied. The print zone is heated to evaporate water in order to control image quality. The curing zone further evaporates water and volatile solvent in order to dry and cure the ink film.

The heated print zone can be used in combination with multi-pass scanning print modes, which consist of printing an image stepwise using multiple passes of a scanning inkjet print head. For example, in a 4-pass print mode, the total ink could be applied in 4 passes of 25% density, each giving an image with 100% ink. Multi-pass print modes with lower ink densities per print head pass allow more facile evaporation and viscosification of the ink with the heating system, limiting ink flow on the printed media and enabling high image quality.

However, it was discovered that this method suffers from the need for dedicated heating systems in the printing zone, where the heating systems have high power demands and the resulting high temperatures can impact printhead reliability and damage sensitive media. Furthermore, slow print modes are also used to limit ink per unit area during the drying stage, leading to low overall printing speeds.

On porous paper-based media, one method used to control ink penetration rates has been through the use of a "fixer" solution, which contains components that interact with ink to reduce colorant mobility. Typically, the fixer is applied to the media prior to printing the ink in the print zone in order to slow the rate of penetration of the ink colorant relative to the rate of penetration of the other components of the ink vehicle so that image quality attributes such as bleed, edge acuity, feathering, and low optical density (due to penetration of colorant into the porous media) are controlled.

Fixer fluids designed for porous media are typically not suitable for nonporous media, such as vinyl. Inks designed for paper typically have trouble wetting low surface energy media, such as vinyl or polyolefins. Furthermore, obtaining durability for nonporous media is often much more difficult than for paper-based media, especially for applications requiring outdoor weatherability. Traditional ink-jet fixers for paper-based media do not provide images with adequate abrasion, water, solvent, and cleaning fluid resistance to meet end-use conditions, and can also impact light fade stability or ink film permanence in outdoor environments.

It has thus been recognized that a fixer fluid can be designed for non-porous substrates and can be printed utilizing a method that provides for good image quality, bleed, and coalescence. For example, printing a fixer fluid with an ink on non-porous media can provide printing benefits otherwise not achieved with previous solutions.

The present disclosure is directed to cationic inkjet-printed fixer fluids that are used in conjunction with anionic aqueous inkjet inks and provide faster printing with good printing characteristics when used on non-porous media, such as vinyl. When combined with ink on the printed media surface, the fixer fluid slows the migration of ink leading to image quality defects, such as color-to-color mixing and area fill non-uniformities.

With the above in mind, a fixer fluid can comprise a liquid vehicle including water and co-solvent, a surfactant, and a cationic polymer. The fixer fluid is formulated for printing on non-porous media. As used herein, the term "cationic polymer" refers to an ionic polymer where the specific ions are cationic in nature, e.g. a quaternized polyamine.

More specifically, the fixer fluid generally comprises a liquid vehicle, a surfactant, and a cationic polymer, where the liquid vehicle includes water and co-solvent. The co-solvent has a boiling point from 160° C. to 250° C. and is generally present in an amount of 1 wt % to 40 wt %, and the fixer fluid is formulated for printing on non-porous media. Also, the fixer fluid does not include more than 5 wt % volatile co-solvent and also does not include more than 3 wt % non-volatile co-solvent. In one specific aspect, the fixer fluid can include multiple co-solvents having a boiling point ranging from 160° C. to 250° C. In another example, the liquid vehicle can be devoid of non-volatile solvent. In another example, the liquid vehicle can be devoid of volatile solvent.

It is noted that when discussing the present compositions, systems, and methods, each of these discussions can be considered applicable to each of these embodiments, whether or not they are explicitly discussed in the context of that embodiment. Thus, for example, in discussing a cationic polymer in a fixer fluid, such a cationic polymer can also be used in a printing system or a method of producing an image on non-porous media, and vice versa.

As used herein, "co-solvent" refers to organic solvents that have a boiling point ranging from 160° C. and 250° C. As used herein, "non-volatile solvent" refers to an organic solvent that has a boiling point above 250° C. As used herein, "volatile solvent" refers to an organic solvent that has a boiling point of less than 160° C. As water is not an organic solvent, it is independent of these three categories, and therefore, not limited by the ranges recited for these categories. The present solvent system has a specific organic solvent boiling point profile that is driven by a number of criteria. First, the co-solvents are removable with heated drying, otherwise they persist in the dried ink film, and residual non-volatile solvent persisting in the dried ink/fixer film can damage the durability of the image. Second, with solvents below a boiling point of 160° C., providing a printing system that is substantially free of odor becomes difficult. Additionally, printhead reliability and environmental health and safety (toxicity, exposure limits, flashpoint) also worsen with solvent boiling points below 160° C. These limitations constrain the types of solvents that can be used in large amounts in accordance with examples of the present disclosure.

Generally, the fixer fluid is applied by ink-jet printing and is formulated to print onto non-porous media. As such, in one example, the fixer fluid can be formulated with ratios of co-solvents, surfactants, and cationic polymers such that the fixer fluid can uniformly wet vinyl and other non-porous media with surface energies lower than 40 dynes/cm, as measured by the ASTM D2578 method.

Generally, the fixer fluid is formulated so that when combined with an ink on the media, the combination of the two after drying provides an image with acceptable durability. Durability test methods include tape adhesion (ASTM 3359 method), fingernail scratch resistance, Taber dry rub abrasion resistance, and wet rub resistance toward water, solvent, and cleaning solutions. The printed image can also retain outdoor weatherability toward light fade and other defects, as measured by the SAE J2527 method published Feb. 11, 2004.

Additionally, the fixer fluid can be applied by inkjet printing on the nonporous media only in areas covered by the ink. This imagewise method eliminates two major issues with fixer applied as a uniform coating on the media. First, fixer fluidic efficiency is increased, reducing the raw material cost per page, and minimizing the amount of fluid that is to be dried by a drying system, which helps lower drier power settings and allows increased printing speeds. Second, it removes the need that the fixer alone have high durability in order to avoid damage or transfer in un-inked areas of the image.

Inks for use with the cationic fixer are anionic in nature. As used herein, "anionic" refers to inks containing pigment dispersions containing ionic dispersing groups with a substantially anionic charge, or other anionic components such as polymers or surfactants, where the anionic functionality is provided by carboxylate, phosphate, or similar chemical functional groups.

In the printer, the volume of fixer fluid applied is determined by the amount of ink used for the specified image. Specific ratios of ink and fixer are dependent on the specific chemistry and concentration of both the cationic polymer in the fixer and the anionic components in the ink. The volume of fixer used is a function of the micromoles per liter of anionic charge from the ink relative to the micromoles per liter of cationic charge from the fixer. The volume of fixer applied contains sufficient cationic charge that charge neutralization of the anionic equivalents in the ink occurs, leading to flocculation of the pigment particles. The particle aggregation minimizes ink flow on the media surface and subsequent ink defects in the printed image (although other mechanisms beyond this charge neutralization mechanism can also be envisioned). Combinations of ink and fixer substantially above or below the point of zero charge afford poorer fixation of the ink.

The ratios are controlled by the amount of ink and fixer printed on the media, the charge density of the cationic and anionic moieties in the fixer and ink, and the loadings of the cationic and anionic materials in the fixer and the ink. It has been found that there are specific mixing ranges of fixer and ink that function to control image quality; and specific ranges that do not. In one example, the volume of fixer printed can be based on the amount of ink so that the total cationic equivalents of ionic change is equivalent to a factor X multiplied by the anionic equivalents of the ink, where X is from 0.1 to 10. In one aspect, X can be from 0.5 to 3.

The amount of fixer can also be adjusted depending on printer throughput, especially when used in conjunction with heated drying. Faster scanning speeds/higher ink flux benefits from either higher fixer amounts and/or higher heating levels when compared to slower speeds. The imaging method also provides a method to control the gloss level of an image, e.g., by controlling the ratio of fixer to ink, the level of image gloss, as measured by a BYK-Gardner glossmeter at 60°, can be controlled from high to low—a benefit for glare reduction of glossy images.

The present printing methods can allow for faster printing onto non-porous media in printing system using heated drying, due to the ability to control ink migration at high speed. The use of a fixer fluid allows the ink to be printed in fewer passes of the printhead with higher printhead carriage speeds (higher ink flux per area per second), and also allows the use of lower temperatures directly in the print zone. In one example, the use of a fixer fluid can allow the use of a 6-pass printmode, which is an improvement over the default 10-pass printmode, where the corresponding throughput is 170 sqft/h vs. 100 sqft/h for a 60" wide printer employing an array of printheads with a 1.66" swath width.

As used herein, "liquid vehicle" refers to the liquid fluid in which a cationic polymer is placed to form the fixer fluid. As used herein, "ink vehicle" refers to the liquid fluid in which a colorant is placed to form the ink. In one example, the colorant can be a pigment. Liquid vehicles and ink vehicles are well known in the art, and a wide variety of such vehicles may be used with the methods of the present invention. Such vehicles may include a mixture of a variety of different agents, including, surfactants, solvents, co-solvents, anti-kogation agents, buffers, biocides, sequestering agents, viscosity modifiers, surface-active agents, water, etc. Though not part of the vehicle per se, in addition to the colorants, the vehicle can carry solid additives such as polymers, latexes, UV curable materials, plasticizers, pigments, etc. Additionally, the term "aqueous liquid vehicle," "aqueous ink vehicle," or "aqueous vehicle" refers to a vehicle including water as a solvent. In one aspect, water can comprise a majority of the vehicle.

Furthermore, as used herein, "pigment" generally includes pigment colorants, magnetic particles, aluminas, silicas, and/or other ceramics, organo-metallics or other opaque particles. In one example, the colorant can be a pigment. In one aspect, the colorant can be a pigment that imparts color. In one example, the ink can include an anionic pigment dispersion. In one aspect, the anionic pigment dispersion can comprise a self-dispersed pigment. In another aspect, the anionic pigment dispersion can comprise a pigment dispersed with an anionic surfactant. In another aspect, the anionic pigment dispersion can comprise a pigment dispersed with a polymeric dispersant.

In addition to the above, the present inks can further comprise a latex. As used herein, "latex" or "latex particulate" refers to discrete polymeric masses dispersed in a fluid, e.g., water.

The monomers used in the latexes can be vinyl monomers. As such, the monomers can be selected from the group of vinyl monomers, acrylate monomers, methacrylate monomers, styrene monomers, combinations thereof, and mixtures thereof.

In one example, the monomers can be selected from the group of vinyl monomers, acrylate monomers, methacrylate monomers, styrene monomers, ethylene, vinyl chloride, vinylidene chloride, maleate esters, fumarate esters, itaconate esters combinations thereof, and mixtures thereof. In one aspect, the monomers can include acrylates, methacrylates, and styrenes. Additionally, the monomers can include hydrophilic monomers including acid monomers, and hydrophobic monomers.

Monomers that can be polymerized in forming the latex particulates include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinyl-carbazole, N-vinyl-caprolactam combinations thereof, derivatives thereof, and mixtures thereof.

Acidic monomers that can be polymerized in forming the latex particulates include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

Regarding the latex particulates, the latexes can have various particle sizes, and molecular weights. In one example, the latex particulates may have a weight average molecular weight ($M_w$) of about 5,000 to about 500,000. In one aspect, the latex particulates can have a weight average molecular weight ($M_w$) ranging from about 100,000 to about 500,000. In some other examples, the latex resin has a weight average molecular weight of about 200,000 to 300,000.

Further, the average particle diameter of the latex particles can be from about 10 nm to about 1 μm; in some other examples, from about 10 nm to about 500 nm; and, in yet other examples, from about 100 nm to about 300 nm. The particle size distribution of the latex is not particularly limited, and either latex having a broad particle size distribution or latex having a mono-dispersed particle size distribution may be used. It is also possible to use two or more kinds of latex particles each having a mono-dispersed particle size distribution in combination.

Typical fixer liquid vehicle formulations described herein can include water, and can further include co-solvents having a boiling point ranging from 160° C. to 250° C. present in total at from 1 wt % to 40 wt %, depending on the inkjet printhead profile. In one aspect, these co-solvents can be present from 5 wt % to 30 wt %. As mentioned, little to no volatile and non-volatile co-solvents can be present, as set forth previously. Further, additional non-ionic, cationic, and/or anionic surfactants can be present, ranging from 0.01 wt % to 10 wt %. Cationic and nonionic surfactants are generally used, as many anionic surfactants can give solubility issues in the presence of a cationic polymer. As such, in one example, the fixer fluid can include a cationic surfactant, nonionic surfactant, fluorosurfactant, silicone surfactant, and mixtures thereof. In one aspect, the fixer fluid can include a nonionic surfactant and a fluorosurfactant. In addition to the polymer or pigment, the balance of the formulation can be purified water, or other vehicle components known in the art, such as biocides, viscosity modifiers, materials for pH adjustment, sequestering agents, preservatives, and the like.

Typical ink liquid vehicle formulations described herein can include water, and can further include solvents present in total at from 0.1 wt % to 50 wt %, depending on the inkjet printhead profiles. In one example, the ink liquid vehicle can be an aqueous liquid vehicle having a majority of water as a solvent. Further, other vehicle components, including those discussed for the fixer liquid vehicle, can be added, as well as other ink components include the surfactants discussed herein.

Polymeric cationic polymers, also referred to as cationic polyelectrolytes, contain either guanidinium or fully quaternized ammonium functionalities, such as quaternized polyamine copolymers. In one example, the cationic polymer does not contain primary or secondary ammonium functionalities, such as polyallylamine or polyethylene imine, due to yellowing issues in outdoor exposure. Generally, the weight average molecular weight ($M_w$) of the cationic polymer allows viscosity less than 25 cP at 25° C., as measured on a Brookfield viscometer. Typical $M_w$ are less than 500,000, and in one aspect, less than 50,000. In one example, cationic polymers can have high charge densities to improve fixing efficiencies. As such, cationic charge densities can be higher than 1000 microequivalents per gram cationic functionality. In one aspect, higher than 4000 microequivalents per gram. Additionally, concentrations can be low to avoid regulatory issues with aquatic toxicity: range 0.1 wt % to 25 wt %, and in one aspect, 1 wt % to 2.5 wt %.

Classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or more polycations may be used, and that any desirable combination of the polycations can be used. One or more ions of the cationic polyelectrolytes may be ion-exchanged for a nitrate, acetate, mesylate, or other ion. As a non-limiting example, one preferred material is Floquat® FL2350, a quaternized polyamine derived from epichlorohydrin and dimethyl amine, commercially available from SNF Inc.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, pyrrolidinones, N-alkyl caprolactams, unsubstituted caprolactams, both substituted and unsubstituted formamides, both substituted and unsubstituted acetamides, and the like.

In one example, co-solvents can include the following: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol (MPdiol); dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof. Other solvents can be used above or below the 160° C. to 250° C. boiling point range, provided that the total loading above this range is less than 3 wt %, and below this range is less than 5 wt %.

Consistent with the formulation of this disclosure, various other additives may be employed to enhance the properties of the ink composition and/or fixer fluid composition for specific applications. Examples of these additives are those added to inhibit the growth of harmful microorganisms. These additives may be biocides, fungicides, and other microbial agents, which are routinely used in ink formulations and fixer formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. Viscosity modifiers and buffers may also be present, as well as other additives known to those skilled in the art to modify properties of the ink as desired. Such additives can be present at from 0 wt % to 20 wt %.

In addition to the above, an ink set can comprise a fixer fluid and an ink, where fixer fluid is formulated for printing on non-porous media. The fixer fluid and the ink can comprise any of those as described herein. Additionally, in one example, the ink can comprise an anionic pigment dispersion and a latex.

Additionally, a method of producing an image on non-porous media can comprise printing a fixer fluid on the non-porous media, and printing an ink on the fixer fluid. In one example, the ratio of ink and fixer fluid can be chosen to maximize image quality and durability. In one aspect, the printing of the fixer fluid and the printing of the ink generates a 60° gloss of 40 by controlling the ratio of printed fixer fluid to printed ink.

Additionally, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following examples illustrate some embodiments of the present ink-jet ink compositions and methods that are presently known. However, it is to be understood that the following are only exemplary or illustrative of the application of the principles of the present compositions, methods, and systems. Numerous modifications and alternative compositions, methods, and systems may be devised by those skilled in the art without departing from the spirit and scope of the present compositions and methods. The appended claims are intended to cover such modifications and arrangements. Thus, while the present compositions, methods, and systems have been described above with particularity, the following examples provide further detail in connection with what are presently deemed to be the acceptable embodiments.

Example 1—Ratio Calculation of Fixer to Ink

An image was prepared by ink-jetting a cyan ink containing about 2200 microequivalents per gram of anionic functionality and a fixer solution containing about 16000 microequivalents per gram of cationic functionality, where amounts are estimated based on the theoretical ink and fixer compositions. The image was prepared by jetting 3 drops of ink in every 1/600×1/600 inch² pixel. For this particular ink and fixer combination, it was found that good image quality can be achieved at approximately an amount of total fixer fluid that was 12% of the ink volume (0.48 drops/600$^{th}$ coverage) for good fixation. This ratio is very close to the point of zero charge (14%) resulting from charge neutralization of the anionic ink equivalents with cationic ink equivalents. In this particular example, the use of lower fixer levels such as 2% (0.06 drops/600$^{th}$) or higher levels such as 36% PT (1.08 drops/600$^{th}$) fluid do not provide adequate fixation. The above concepts can be used to adjust the concentrations of the cationic polymer in the fixer fluid to best enhance image quality while lowering the total amount of fluid printed on the media.

Example 2—Ink-Jet Ink Preparation

An ink-jet ink composition was prepared by admixing the compositional elements in the amounts listed in Table 1.

TABLE 1

| Ingredients | Ink 1 (wt %) |
|---|---|
| 2-methyl-1,3-propanediol | 9.0 |
| 2-pyrrolidinone | 19.0 |
| Self-dispersed cyan pigment | 1.6 |
| Acrylic latex | 7.0 |
| Fluorosurfactant | 0.8 |
| Nonionic surfactant | 0.3 |
| Deionized water | Balance |
| pH(KOH) | 8 |

Example 3—Fixer Fluid Preparation

Fixer compositions were prepared by admixing the compositional elements in the amounts listed in Table 2.

TABLE 2

| Ingredients | Fixer 1 (wt %) | Fixer 2 (wt %) | Fixer 3 (wt %) | Fixer 4 (wt %) | Fixer 5 (wt %) | Fixer 6 (wt %) | Fixer 7 (wt %) |
|---|---|---|---|---|---|---|---|
| 2-methyl-1,3-propanediol | 9.0 | — | 9.0 | 9.0 | 9.0 | 9.0 | 9.0 |
| 2-pyrrolidinone | 19.0 | — | 19.0 | 19.0 | 19.0 | 19.0 | 19.0 |
| trimethylolpropane | — | 16.0 | — | — | — | — | — |
| N-methyl morpholine N-oxide | — | 4.0 | 4.0 | 4.0 | — | — | — |
| Fluorosurfactant | 0.8 | 0.8 | 0.8 | — | 0.8 | 0.8 | 0.8 |
| Nonionic surfactant | 0.3 | 0.3 | 0.3 | — | 0.3 | 0.3 | 0.3 |
| Floquat ® FL2350 | 1.3 | 1.3 | 1.3 | 1.3 | — | — | — |
| Floquat ® DEC50 | 1.5 | 1.5 | 1.5 | 1.5 | — | — | — |
| Calcium nitrate Hexahydrate | — | — | — | — | — | 5.0 | — |
| Deionized water | Balance | Balance | Balance | Balance | Balance | Balance | Balance |
| pH (methanesulfonic acid) | 4 | 4 | 4 | 4 | — | — | — |
| pH (succinic acid) | — | — | — | — | 4 | 4 | 7 |

Example 4—Printing Characteristics

The fixer fluids of Example 3 were printed followed by the ink-jet ink of Example 2 onto MP12900, a non-porous vinyl media (available from Avery Graphics). The results of the printing are listed in Table 3. Fixer 1 has the best overall performance. Fixer 1 contains organic co-solvents, a wetting package suitable for MP12900 vinyl, and a blend of high charge density cationic polymers. When compared to Fixer 7, which does not contain the cationic polymer blend, or ink printed without fixer, the improvement in area fill uniformity and rub resistance can be seen.

Fixers 2 and 3 contain nonvolatile solvents for use on paper-based media with a wetting package suitable for MP12900. Here the fixer is shown to wet and improve area fill quality on the media, but the Windex rub resistance is impacted by the presence of the nonvolatile solvents.

Fixer 4 does not contain a suitable wetting package for vinyl, so the area fill quality is affected. Fixer 5 does not contain a cationic polymer as a fixer, but instead uses succinic acid as a fixer, a component used as a fixing agent for porous media. This combination does not hurt durability, but does not improve image quality.

Fixer 6 contains calcium nitrate, another common fixing ingredient claimed for porous media. The calcium salt improves area fill quality over the control Fixer 7, but has an adverse effect on the rub resistance. The fixing effect of the calcium salt at 5 wt % loading is not as effective as the cationic polymer blend in Fixer 1 at 2.8 wt %.

TABLE 3

| Fixer | Area Fill Quality (higher is better) | Windex ® Taber Rub Resistance |
|---|---|---|
| 1 | 10 | Best |
| 2 | 10 | Poor |
| 3 | 10 | Poor |
| 4 | 3 | Poor |
| 5 | 5 | Good |
| 6 | 8 | Poor |
| 7 | 5 | Good |
| None | 4 | Good |

Example 5—Printing Characteristics

A test pattern consisting of 24 blocks of varying fixer level were printed with the inks in Table 4 and the fixers in Table 5.

TABLE 4

| Ingredients | Ink 2 (wt %) | Ink 3 (wt %) |
|---|---|---|
| 2-pyrrolidinone | 16.0 | 16.0 |
| 2-methyl-1,3-propanediol | 9.0 | 9.0 |
| Phthalocyanine cyan pigment | 2.4 | — |
| Carbon black pigment | — | 2.5 |
| Styrene acrylic dispersant | 0.7 | 0.7 |
| Acrylic latex | 6.0 | 6.0 |
| Floquat ® FL2350 | 2.5 | 2.5 |
| Silicone surfactant | 1.0 | 1.0 |
| Nonionic surfactant | 0.5 | 0.5 |
| Deionized water | Balance | Balance |

TABLE 5

| Ingredients | Fixer 8 (wt %) | Fixer 9 (wt %) | Fixer 10 (wt %) | Fixer 11 (wt %) | Fixer 12 (wt %) |
|---|---|---|---|---|---|
| 2-pyrrolidinone | 16.0 | 16.0 | 16.0 | 16.0 | 16.0 |
| 2-methyl-1,3-propanediol | 9.0 | 9.0 | 9.0 | 9.0 | 9.0 |
| Floquat ® FL2350 | 0.50 | 1.00 | 2.50 | 3.50 | 5.00 |
| Silicone surfactant | 1.0 | 1.0 | 1.0 | 1.0 | 1.0 |
| Nonionic surfactant | 0.5 | 0.5 | 0.5 | 0.5 | 0.5 |
| Deionized water | Balance | Balance | Balance | Balance | Balance |

Each block contained a dark cyan area fill with a 2 mm black line in the middle in order to assess cyan/black bleed. The amount of black and cyan ink in each block was held constant at an ink density of 30 picoliters per 600 dpi pixel (=1/600×1/600 in$^2$), while the amount of fixer printed varied from 0 picoliters to 30 picoliters per 600 dpi pixel. The fixers contained cationic polymer loadings ranging from 0.5 wt %, 1.0 wt %, 2.5 wt %, 3.5 wt %, and 5 wt %. Printed fixer levels varied from 0 drops/600 dpi pixel to 2.5 drops/600 dpi pixel. As a percentage of ink, printed fixer fluid levels were: 0%, 2%, 4%, 6%, 8%, 10%, 12%, 14%, 16%, 18%, 20%, 22%, 24%, 26%, 28%, 30%, 32%, 40%, 50%, 60%, 70%, 80%, 90%, and 100%.

Black to cyan bleed (in mm of penetration) was graded as a function of fixer level and cationic polymer concentration. Area fill uniformity was ranked visually on a relative 1 to 10 scale (10=worst), where a score of '2' (slight defects) is considered acceptable, and scores >5 had area fills with a severe mottled appearance, or incomplete ink coverage. At higher fixer fluid levels (typically >28-32% fixer), the image appeared "flooded". Flooded samples were given a score of '20'. Specular gloss of the samples was measured with a BYK-Gardner glossmeter.

Figure 2:
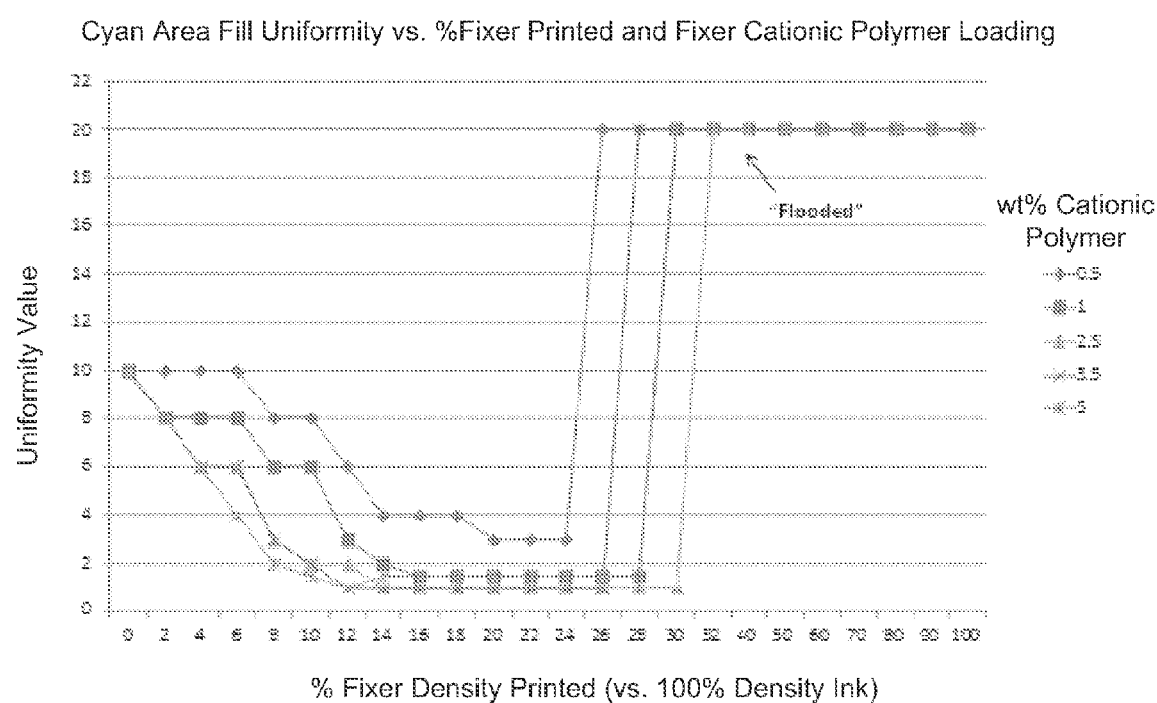
FIG. 2 is a graph of uniformity vs. % fixer density printed in accordance with an example of the present disclosure.
Figure 3:
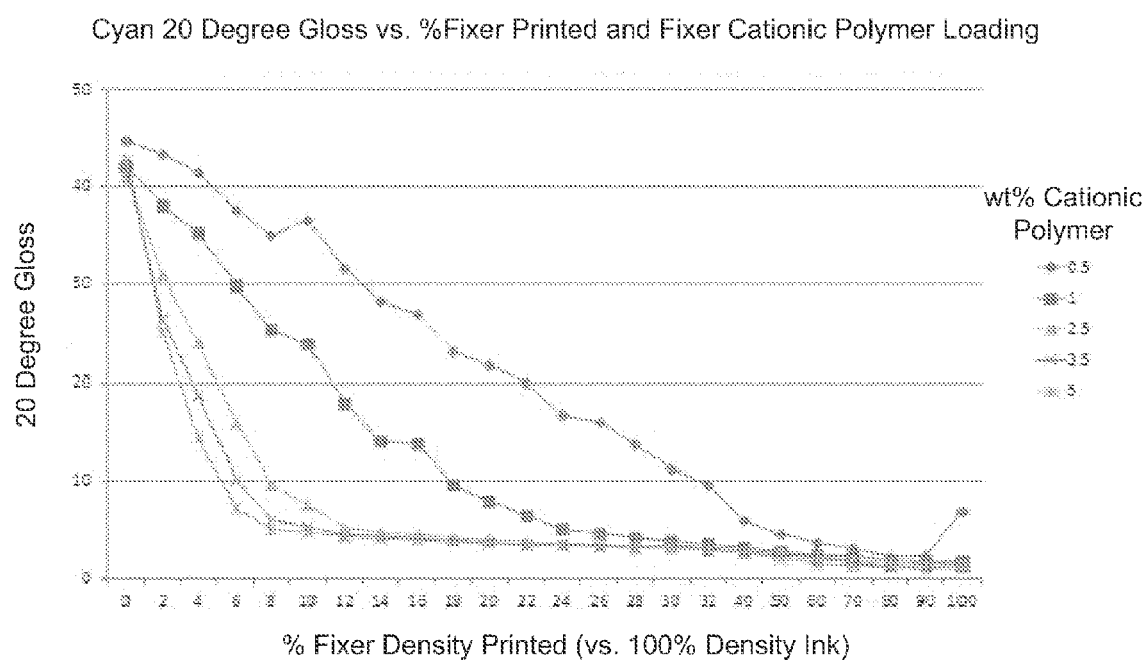
FIG. 3 is a graph of 20 degree gloss vs. % fixer density printed in accordance with an example of the present disclosure.

FIGS. 1-3 show the impact of cationic polymer loading in the fixer and the percentage of fixer fluid printed relative to 100% ink for bleed control, area fill uniformity, and specular gloss. With respect to FIG. 1, the lower the number for the Bleed Value, the better. In one example, the Bleed Value goal can be less than 2.5. Regarding FIG. 2, the lower the number for the Uniformity Value, the better. In one example, the Uniformity Value can be less than 2. FIG. 3, on the other hand, provides data regarding gloss. Furthermore, Scheme 1, shown below, sets for the point of zero charge (PZC) calculated from the sum of the cationic equivalents present in the fixer plus the anionic equivalents in the cyan ink.

For each cationic polymer loading, an amount of fixer fluid is used for image quality control. Bleed, area fill uniformity, and gloss control each utilize fixed ratios of ink and fixer, consistent with the anionic/cationic stoichiometry of the ink and fixer chemistries used, and fairly close to the PZC of the fixer/ink combination. For instance, a fixer with a cationic polymer loading of 0.5% printed at 8% fixer gives similar image quality to a fixer with a 1% cationic polymer loading printed at 4% fixer.

Low cationic polymer loadings are less effective if the amount of fixer added is not near the PZC. At lower cationic polymer levels, such as 0.2 wt % or less, fixation of the image was poor, regardless of the amount of fixer fluid applied to the image. At higher fixer fluid levels, typically greater than 28-32% fixer (0.8 drops/600 dpi fixer, 2.5 drops/600 dpi ink), good area fill uniformity does not occur due to increased dilution, or cationic charge reversal on the particles, even though the point of zero charge has been reached.

Scheme 1

μeq/g cationic charge in fixer:

| Cationic Polymer Loading | | | | |
|---|---|---|---|---|
| 0.50 wt % | 1.00 wt % | 2.50 wt % | 3.50 wt % | 5.00 wt % |
| 3633 | 7267 | 18167 | 25434 | 36335 |

μeq/g anionic charge in ink: 2137
Charge annihilation: net charge after fixer addition to 100% ink, in μeq/g.
Net charge: total cationic charge minus total anionic charge.

| | Cationic Polymer Loading | | | | |
|---|---|---|---|---|---|
| % Fixer | 0.5 wt % | 1 wt % | 2.5 wt % | 3.5 wt % | 5 wt % |
| 0 | −2137 | −2137 | −2137 | −2137 | −2137 |
| 2 | −2064 | −1992 | −1774 | −1628 | −1410 |
| 4 | −1992 | −1846 | −1410 | −1120 | −684 |
| 6 | −1919 | −1701 | −1047 | −611 | 43 |
| 8 | −1846 | −1556 | −684 | −102 | 770 |
| 10 | −1774 | −1410 | −320 | 406 | 1496 |
| 12 | −1701 | −1265 | 43 | 915 | 2223 |
| 14 | −1628 | −1120 | 406 | 1424 | 2950 |
| 16 | −1556 | −974 | 770 | 1932 | 3677 |
| 18 | −1483 | −829 | 1133 | 2441 | 4403 |
| 20 | −1410 | −684 | 1496 | 2950 | 5130 |
| 22 | −1338 | −538 | 1860 | 3458 | 5857 |
| 24 | −1265 | −393 | 2223 | 3967 | 6583 |
| 26 | −1192 | −248 | 2586 | 4476 | 7310 |
| 28 | −1120 | −102 | 2950 | 4985 | 8037 |
| 30 | −1047 | 43 | 3313 | 5493 | 8763 |

Example 6—Printer Throughput

Fixer 1 was printed with LX610 latex inks (Hewlett Packard) onto Avery MP12900 media at three different print zone temperatures (25° C., 45° C., and 55° C.) and four different printing speeds (45, 80, 110, and 140 m$^2$/h). Fixer 1 fluid levels in the image were adjusted as a percentage of the ink density. Two fixer fluid levels were used (based on 100% ink): 0% or 12% fixer. Image quality was assessed visually (Tables 6 and 7). At higher printing speeds or lower print zone temperatures with 0% fixer, image quality degraded due to color-to-color bleed and area fill non-uniformities. With 12% fixer, image quality was good to 110 m$^2$/h, even at a lower print zone of 25° C.

TABLE 6

| Printzone | Image Quality without Fixer | | | |
|---|---|---|---|---|
| Temp (° C.) | 45 m$^2$/h | 80 m$^2$/h | 110 m$^2$/h | 140 m$^2$/h |
| 25 | Poor | Poor | Poor | Poor |
| 45 | Good | Good | Poor | Poor |
| 55 | Good | Good | Fair | Poor |

TABLE 7

| Printzone | Image Quality with Fixer | | | |
|---|---|---|---|---|
| Temp (° C.) | 45 m$^2$/h | 80 m$^2$/h | 110 m$^2$/h | 140 m$^2$/h |
| 25 | Good | Good | Good | Fair |
| 45 | Good | Good | Good | Good |
| 55 | Good | Good | Good | Good |

While the disclosure has been described with reference to certain embodiments, those skilled in the art will appreciate that various modifications, changes, omissions, and substitutions can be made without departing from the spirit of the disclosure. It is intended, therefore, that the present disclosure be limited only by the scope of the following claims.

What is claimed is:

1. An ink set, comprising:
   an ink-jettable fixer fluid, the fixer fluid comprising:
   a liquid vehicle including water and co-solvent having a boiling point from 160° C. to 250° C., the co-solvent present in the fixer fluid in an amount of 1 wt % to 40 wt %, wherein the co-solvent comprises 2-methyl-1,3-propanediol,
   a surfactant, the surfactant present in the fixer fluid in an amount of 0.1 wt % to 10 wt %, and
   a cationic polymer, the cationic polymer present in the fixer fluid in an amount of 0.1 wt % to 25 wt %, wherein the cationic polymer has a cationic charge density higher than 1000 microequivalents per gram cationic functionality,
   wherein the fixer fluid is formulated for printing on non-porous media and does not include more than 5 wt % volatile co-solvent having a boiling point of less than 160° C. and more than 3 wt % non-volatile co-solvent having a boiling point of more than 250° C.; and
   an ink, the ink comprising an anionic pigment dispersion and a latex.

2. The ink set of claim 1, wherein the anionic pigment dispersion comprises a self-dispersed pigment, a pigment dispersed with an anionic surfactant, or a pigment dispersed with an anionic polymer; and the latex includes polymerized monomers selected from the group of: styrene, p-methyl styrene, a-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, and mixtures thereof.

3. The ink set of claim 1, wherein the liquid vehicle further contains at least one co-solvent selected from the group of: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrrollidinone; n-ethylpyrrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof and wherein the cationic polymer is selected from the group of quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof.

4. The ink set of claim 1, wherein the fixer fluid comprises multiple co-solvents having a boiling point from 160° C. to 250° C. present in a combined amount of 5 wt % to 30 wt %, and the cationic polymer is present in the fixer fluid at a concentration of 1 wt % to 5 wt %.

5. A method of producing an image on non-porous media, comprising:
   printing a fixer fluid on the non-porous media, the fixer fluid comprising:
   a liquid vehicle including water and co-solvent having a boiling point from 160° C. to 250° C., the co-solvent present in the fixer fluid in an amount of 1 wt % to 40 wt %, wherein the co-solvent comprises 2-methyl-1,3-propanediol,
   a surfactant, the surfactant present in the fixer fluid in an amount of 0.1 wt % to 10 wt %, and
   a cationic polymer, the cationic polymer present in the fixer fluid in an amount of 0.1 wt % to 25 wt %,
   wherein the fixer fluid does not include more than 5 wt % volatile co-solvent having a boiling point of less than 160° C. and more than 3 wt % non-volatile co-solvent having a boiling point of more than 250° C.; and
   printing an ink on the fixer fluid, the ink comprising an anionic pigment dispersion and a latex,
   wherein the fixer fluid comprises multiple co-solvents having a boiling point from 160° C. to 250° C. present in a combined amount of 5 wt % to 30 wt %, the cationic polymer is present in the fixer fluid at a concentration of 1 wt % to 2.5 wt %, and the cationic polymer has a cationic charge density higher than 1000 microequivalents per gram cationic functionality.

6. A method of producing an image on non-porous media, comprising:
   printing a fixer fluid on the non-porous media, the fixer fluid comprising:
   a liquid vehicle including water and co-solvent having a boiling point from 160° C. to 250° C., the co-solvent present in the fixer fluid in an amount of 1 wt % to 40 wt %, wherein the co-solvent comprises 2-methyl-1,3-propanediol,
   a surfactant, the surfactant present in the fixer fluid in an amount of 0.1 wt % to 10 wt %, and
   a cationic polymer, the cationic polymer present in the fixer fluid in an amount of 0.1 wt % to 25 wt %,
   wherein the fixer fluid does not include more than 5 wt % volatile co-solvent having a boiling point of less than 160° C. and more than 3 wt % non-volatile co-solvent having a boiling point of more than 250° C.; and
   printing an ink on the fixer fluid, the ink comprising an anionic pigment dispersion and a latex,
   wherein the fixer fluid is printed in an amount based on the amount of ink, so that the total cationic equivalents of ionic change is equivalent to a factor X multiplied by the anionic equivalents of the ink, where X is from 0.1 to 10.

7. The method of claim 6, wherein X is from 0.5 to 3.

8. A method of producing an image on non-porous media, comprising:
   printing a fixer fluid on the non-porous media, the fixer fluid comprising:
   a liquid vehicle including water and co-solvent having a boiling point from 160° C. to 250° C., the co-solvent present in the fixer fluid in an amount of 1 wt % to 40 wt %, a surfactant, the surfactant present in the fixer fluid in an amount of 0.1 wt % to 10 wt %, and a cationic polymer, the cationic polymer present in the fixer fluid in an amount of 0.1 wt % to 25 wt %, wherein the fixer fluid does not include more than 5 wt % volatile co-solvent having a boiling point of less than 160° C. and more than 3 wt % non-volatile co-solvent having a boiling point of more than 250° C.; and printing an ink on the fixer fluid, the ink comprising an anionic pigment dispersion and a latex;

wherein the fixer fluid is printed in an amount based on the amount of ink, so that the total cationic equivalents of ionic change is equivalent to a factor X multiplied by the anionic equivalents of the ink, where X is from 0.1 to 10.

9. The method of claim 8, wherein X is from 0.5 to 3.

10. The method of claim 8, wherein the fixer fluid is devoid of volatile co-solvents having a boiling point of less than 160° C. and non-volatile co-solvents having a boiling point of more than 250° C.

11. The method of claim 8, wherein the fixer fluid comprises multiple co-solvents having a boiling point from 160° C. to 250° C. present in a combined amount of 5 wt % to 30 wt %.

12. The method of claim 8, wherein the cationic polymer has a cationic charge density higher than 1000 microequivalents per gram cationic functionality.

13. An ink-jettable fixer fluid, comprising:
a liquid vehicle including water and co-solvent having a boiling point from 160° C. to 250° C., the co-solvent present in the fixer fluid in an amount of 1 wt % to 40 wt %;
a surfactant, the surfactant present in the fixer fluid in an amount of 0.1 wt % to 10 wt %; and
a cationic polymer, the cationic polymer present in the fixer fluid in an amount of 0.1 wt % to 25 wt %;
wherein the fixer fluid is formulated for printing on non-porous media and wherein the fixer fluid is devoid of volatile co-solvents having a boiling point of less than 160° C. and non-volatile co-solvents having a boiling point of more than 250° C.

14. The inkjettable fixer fluid of claim 13, wherein the co-solvent comprises 2-methyl-1,3-propanediol.

15. The ink-jettable fixer fluid of claim 13, wherein the liquid vehicle contains at least one co-solvent selected from the group of: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol; dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof and wherein the cationic polymer is selected from the group of quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof.

16. An ink-jettable fixer fluid, comprising:
a liquid vehicle including water and multiple co-solvents having a boiling point from 160° C. to 250° C. present in a combined amount of 5 wt % to 30 wt %;
a surfactant, the surfactant present in the fixer fluid in an amount of 0.1 wt % to 10 wt %; and
a cationic polymer, the cationic polymer present in the fixer fluid in an amount of 0.1 wt % to 25 wt %;
wherein the fixer fluid is formulated for printing on non-porous media and does not include more than 5 wt % volatile co-solvent having a boiling point of less than 160° C. and more than 3 wt % non-volatile co-solvent having a boiling point of more than 250° C.

17. The ink-jettable fixer fluid of claim 16, wherein the fixer fluid is devoid of volatile co-solvents having a boiling point of less than 160° C. and non-volatile co-solvents having a boiling point of more than 250° C.

18. The ink-jettable fixer fluid of claim 16, wherein the cationic polymer has a cationic charge density higher than 1000 microequivalents per gram cationic functionality.

19. The inkjettable fixer fluid of claim 16, wherein the co-solvent comprises 2-methyl-1,3-propanediol.

20. The ink-jettable fixer fluid of claim 16, wherein the liquid vehicle contains at least one co-solvent selected from the group of: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol; dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof and wherein the cationic polymer is selected from the group of quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof.

21. An ink-jettable fixer fluid, comprising:
a liquid vehicle including water and co-solvent having a boiling point from 160° C. to 250° C., the co-solvent present in the fixer fluid in an amount of 1 wt % to 40 wt %;
a surfactant, the surfactant present in the fixer fluid in an amount of 0.1 wt % to 10 wt %; and
a cationic polymer, the cationic polymer present in the fixer fluid in an amount of 0.1 wt % to 25 wt %, wherein the cationic polymer has a cationic charge density higher than 1000 microequivalents per gram cationic functionality;
wherein the fixer fluid is formulated for printing on non-porous media and does not include more than 5 wt % volatile co-solvent having a boiling point of less than 160° C. and more than 3 wt % non-volatile co-solvent having a boiling point of more than 250° C.

22. The ink-jettable fixer fluid of claim 21, wherein the cationic polymer has a cationic charge density higher than 4000 microequivalents per gram cationic functionality.

23. The ink-jettable fixer fluid of claim 21, wherein the fixer fluid is devoid of volatile co-solvents having a boiling point of less than 160° C. and non-volatile co-solvents having a boiling point of more than 250° C.

24. The inkjettable fixer fluid of claim 21, wherein the co-solvent comprises 2-methyl-1,3-propanediol.

25. The inkjettable fixer fluid of claim 21, wherein the cationic polymer is present in the fixer fluid at a concentration of 1 wt % to 5 wt %.

26. The ink-jettable fixer fluid of claim 21, wherein the liquid vehicle contains at least one co-solvent selected from the group of: propylene glycol n-butyl ether; ethylene glycol n-butyl ether; 2,3-butanediol; 1,2-propanediol; propylene glycol; dipropylene glycol methyl ether; 1,2-butanediol; diethylene glycol methyl ether; ethylene glycol; 2-methyl-2,4-pentanediol (hexylene glycol); 2,4-pentanediol; n-methylpyrollidinone; n-ethylpyrollidinone; diethylene glycol ethyl ether; 1,3-butanediol; 3,5-dimethyl-3-hexyne-2,5-diol; 1,2-pentanediol; ethylene glycol n-hexyl ether; 2,2-dimethyl-1,3-propanediol; dipropylene glycol t-butyl ether; 2-methyl-1,3-propanediol; dipropylene glycol n-propyl ether; 1,3-propanediol; 2,5-dimethyl-2,5 hexanediol; 2,5-hexanediol; 1,2-hexanediol; 1,4-butanediol; dipropylene glycol n-butyl ether; diethylene glycol n-butyl ether; 2,2,4-trimethyl-1,3-pentanediol (TMPD glycol); 1,5-pentanediol; 2-ethyl-1,3-hexanediol; tripropylene glycol methyl ether; propylene glycol phenyl ether; ethylene glycol phenyl ether; di(ethylene glycol); di(propylene glycol); 2-pyrollidinone; triethylene glycol methyl ether; and mixtures thereof and wherein the cationic polymer is selected from the group of quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof.

* * * * *

UNITED STATES PATENT AND TRADEMARK OFFICE
CERTIFICATE OF CORRECTION

PATENT NO. : 9,683,120 B2
APPLICATION NO. : 14/426443
DATED : June 20, 2017
INVENTOR(S) : Cagle et al.

It is certified that error appears in the above-identified patent and that said Letters Patent is hereby corrected as shown below:

On the Title Page

Item (12), "Cagle, Jr. et al." should read --Cagle, et al.--

Item (75), Inventors section, "Phillip C Cagle, Jr." should read --Phillip C Cagle--

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*